United States Patent
Baumann

[11] Patent Number: 6,014,198
[45] Date of Patent: Jan. 11, 2000

[54] METHOD FOR SHORTENING THE CLOSURE TIME AND APPARATUS FOR EXECUTING SAME

[75] Inventor: Hans Baumann, Raisdorf, Germany

[73] Assignee: Raytheon Anschutz G.m.b.H., Germany

[21] Appl. No.: 08/863,445

[22] Filed: May 27, 1997

Related U.S. Application Data

[63] Continuation-in-part of application No. 08/648,910, May 16, 1996, abandoned.

[30] Foreign Application Priority Data

May 17, 1995 [DE] Germany .................. 195 18 068

[51] Int. Cl.$^7$ .................. G03B 41/02; G03B 41/10; G03B 1/24
[52] U.S. Cl. .................. 352/105; 352/109; 352/113; 352/120; 352/187
[58] Field of Search .................. 352/105, 109, 352/113, 114, 115, 116, 117, 118, 119, 120, 184, 187

[56] References Cited

U.S. PATENT DOCUMENTS

| | | |
|---|---|---|
| 2,868,066 | 1/1959 | Argyle .................. 352/120 |
| 2,952,183 | 9/1960 | Warrick .................. 352/119 |
| 3,752,568 | 8/1973 | Perreau .................. 352/119 |
| 3,753,612 | 8/1973 | Okey et al. .................. 352/109 |
| 3,937,378 | 2/1976 | Kopernicky .................. 352/184 |
| 3,968,506 | 7/1976 | Lancor, Jr. et al. .................. 352/109 |
| 5,096,288 | 3/1992 | Yano et al. .................. 352/114 |

*Primary Examiner*—Eddie C. Lee
*Attorney, Agent, or Firm*—Shlesinger, Fitzsimmons & Shlesinger

[57] ABSTRACT

The invention refers to a method of shortening the closure time of shutters in cinema projectors of the type in which film is intermittently advanced one frame at a time into registry with an image window in the projector, and wherein each time the film is advanced a shutter in the projector closes the image window during the time that the film is being advanced. According to the invention, an optical compensation of the film motion is effected by determining the rate at which each image of the film begins and ends, respectively, its advance into registry with the image window of the projector, generating a control signal proportionate to the rate, and positioning between the image window and the associated projection screen a movable plane-parallel plate which is adjsuted by the control signal to shorten the closure time of the image window during each film advance, thereby to increase the luminous efficiency factor of the projector.

8 Claims, 6 Drawing Sheets

METHOD FOR SHORTENING THE CLOSURE TIME AND APPARATUS FOR EXECUTING SAME

This application is a continuation-in-part of Ser. No. 08/648,910 filed May 16, 1996 abandoned.

BACKGROUND OF THE INVENTION

This invention refers to a method for shortening the closure time of shutters in cinema projectors, as well as to an apparatus for executing the method by reducing the dark phase, with an optical compensation of the film motion in the uncovered area taking place to increase the luminous efficiency factor. In cinema film projection an intermittent film strip drive has established itself in practice. A very wide variety of shutter designs is employed to withdraw the image from the eye of the viewer during a film transport (dark phase) step. To do this a shutter blade covers the image for the duration of the transport and clears the light path (uncovered region or light phase) when the image has come to a stop. The shutter drive is ordinarily coupled by gears to the intermittent drive and runs synchronously.

According to Talbot's law the light/dark exchange is not perceived if the frequency is adequate, and an impression of continuity is created. With the use of dark fields identical in size, light fluctuations are avoided and the impression of a uniform brightness is created.

The dark phases originating from the shutter substantially reduce the luminous efficiency of the projector. In addition to the glass losses, the shutter, with its 50% efficiency (two-blade shutter) is a major cause of light attenuation.

Various methods intended to increase the luminous efficiency are known.

On the one hand the luminous efficiency can be increased by means of different shutter flap geometry and arrangements. Differing geometries and arrangements lead to a faster or slower covering of the image. The dark phases can be slightly affected.

Diaphragms with blades working in opposite directions or oscillating blades are employed. Tests are also being made with serrated diaphragm edges or perforated diaphragm surfaces, which in turn, however, cause diminished contrast.

On the other hand there are methods utilizing a shutter draw. If the path/time diagram for a film transport step is studied it will be found that the film is only moved at a minimal speed at the beginning and at the end of the step.

In a four-part crosswheel the primary stroke takes place within a range of plus to minus 30° relative to a total angle of rotation of 90°. If the shutter blade is reduced in size so that the step beginning and step end are not covered, then the dark phase is diminished and the luminous efficiency factor becomes greater.

The permissible range is given at 2.5% (0.475 mm) of the total film step movement (19 mm) without the side effects being perceived as all too disruptive.

In any event however a reduction in contrast and a blurring of the image are disadvantageous.

Furthermore, a continuous film transport with optical compensation is known. The optimum is theoretically reached when no shutter at all is necessary.

This can be attained with the aid of the optical compensation. Other than that described in the introductory remarks a continuously transported film strip is taken as a basis.

Optical compensators ensure that the beam path follows the picture so that the image projected onto the screen appears to the viewer to be standing still. There are different basic principles for this.

a) compensation by parallel displacement of a lens that follows the transport motion and then snaps back for the next frame.

b) compensation by mirrors that are tilted to provide a beam deflection.

c) parallel displacement by tilting a plane-parallel glass plate. A polygonal prism is usually used for this. By turning the prism the polygon surface is caused to follow the passing image. The image passes by and the next polygon surface takes up the following image.

The realization of the described optical compensations is extremely complicated and requires the greatest mechanical precision to arrive at satisfactory results at all.

The optical compensators are mechanically driven (for example with a cam drive) synchronously to the film movement. The image position, sharpness and illumination are substantially dependent on this.

The increase in luminous efficiency achieved with the elimination of the shutter is nullified by the optical losses of the extensive optical compensators. The optical compensation therefore has gained no practical significance.

A good description of the prior art is to be found in the book *Laufbildprojektion*, vol. 6, by Herbert Tümmel, published by the Springer Verlag, Vienna, New York; in the book *Filmprojektoren/Filmprojektion* by Kurt Enz, published by the Fotokinoverlag, 1965; and in the book *Kinogerätetechnik* by Harald Weise, Hanover, published by the C. F. Wintersche Verlagsbuchhandlung Füssen.

SUMMARY OF THE INVENTION

The object of the invention is to increase the luminous efficiency factor in film projectors.

According to the invention this is achieved with a method under the characterizing part of the first claim and with an apparatus under the characterizing part of the fourth claim.

The method according to the invention distinguishes itself in that the luminous efficiency factor is increased by reducing the size of the cover angle of the shutter flap without causing diminished contrast or a blurred image. This is effected by an optical compensation of the film movement in the uncovered region.

This optical compensation can be carried out advantageously by means of an optically compensated shutter.

To precisely achieve this it is advantageous to gauge the actual path of the film. This measurement then serves or is used to control the optical compensation in the region to be optically compensated.

The apparatus required to execute the above-given method therefore has an optical compensation without a rigid mechanical coupling to other drive units in the projector.

Additional advantageous embodiments of the invention are described in the subclaims.

BRIEF DESCRIPTION OF THE DRAWINGS

The invention is explained below by way of an example on the basis of the drawings, wherein further essential features and explanations serving to enhance understanding and possibilities for realiziing the inventive idea are described.

DETAILED DESCRIPTION OF THE DRAWINGS

Figure 1A:
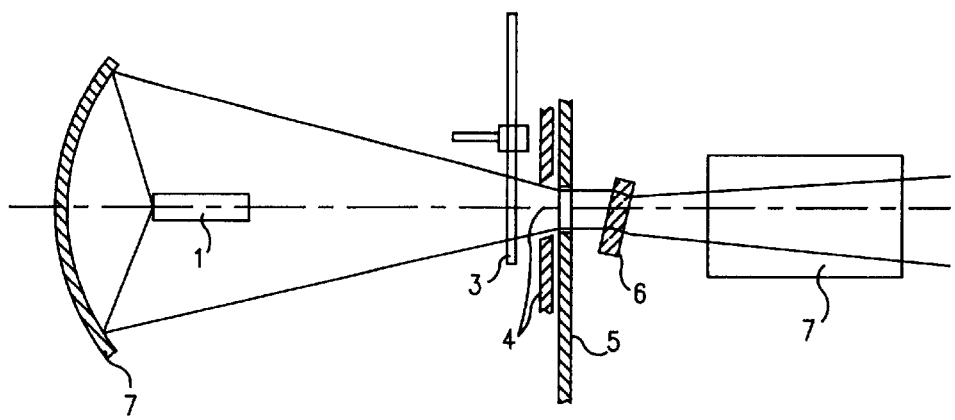
FIG. 1a shows a schematic drawing of an apparatus according to the invention.
Figure 1B:
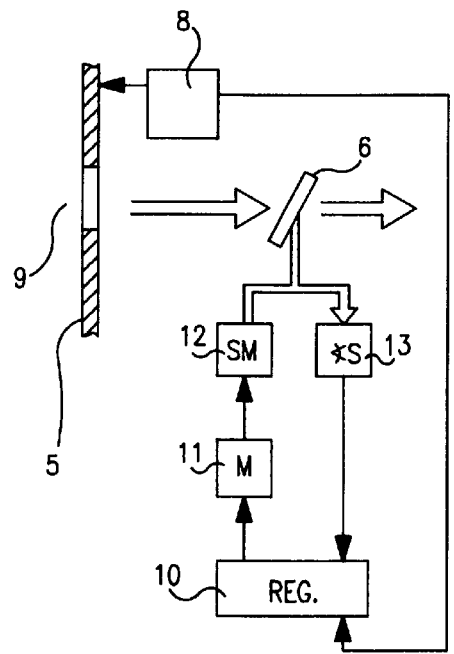
FIG. 1b shows the interrelationship between function and control.

FIGS. 1a and 1b depict a total system of a film projector, utilizing the inventive idea.

An arrangement of the components projector lamp (1), reflection mirror (2), disk rotary shutter (3), film window (4), plane-parallel plate (6) and objective or imagining lens (7) is illustrated in FIG. 1a. Reference number (5) designates a film strip that is passed over the image window (4).

In this arrangement the light produced by the projection lamp (1) is concentrated by the reflection mirror (2) and directed along the beam or optical axis in the direction of the disk shutter (3) behind which the film strip (5) passes by. The shutter (3) is sychronized with the movement of the film strip (5) to block the tranmission of light from mirror (2) to the stationary image window (4) whenever the strip (5) is being moved or advanced in a film transport step, but when the strip (5) has stopped and placed an image in registry with the window (4), the shutter (3) will have been moved to a so-called open position in which it no longer interferes with the transmission of light through window (4) onto the image in the film then registering with the window (4). Upon penetrating through the film strip (5) the light falls onto the plane-parallel plate (6) and then onto the objective or imaging lens (7) that projects the light onto a screen. The advantage of using the plate (6), as noted hereinafter, is that the window(4) closure time by the shutter (3) is shorter than as in known intermittent drive projectors so that during film motion the window (4) remains uncovered longer than usual. Therefore, as the film strip (5) begins a film transport step to to advance another image into registry with the window (4), and the shutter (3) begins to move into a position to block light from the window (4), plate (6) can be tilted in a direction to prolong the transmission of an image to the objective lens (7) as the film strip (5) accelerates at the beginning of a film transport step, and can be tilted back to an idle position as the film strip (5) begins to decelerate to complete movement of a film image into registry with the window (4). The plane-parallel plate (6), therefore has the effect of shortening the closure time of the shutter (3) with respect to the image window (4), and thus also effectively increases the luminous efficiency factor without causing any undesirable diminished contrast or blurring of the image.

FIG. 1b shows the interrelationship between function and control of the optical compensation. An image position sensor (8) (e.g. a capacitive image position and step width sensor) measures the film motion for a film transport step at the step beginning and/or for the step end. Under the given conditions the movement in a lineal measuring path of ±−0.5 mm is sufficient.

This measured value is a setting value of such movement. It is converted to a path signal which is proportional to the rotary angle of the film transport and is fed to a regulator (10). A torquer, scanner or possibly a stepping motor (12) is triggered via a power step or motor drive (11) which is energized by a signal from regulator 10, and tilts the plane-parallel plate (6) proportionally to the path signal, i.e. the path signal is converted to a path-relevant, antiphase tilting angle for the glass plate (6).

The plane-parallel plate (6) is rigidly coupled to an angle sensor (13) that in turn supplies the actual value for the regulator (10).

The luminous efficiency factor is increased by the controlled movement of the plane-parallel plate (6). The covering angle of the shutter flap in this is reduced in size without resulting in diminished contrast or a blurred image.

Image migration becoming visible at the step beginning and step end is brought about by the optical compensation in the shape of the tiltable plane-parallel glass plate (6). A controlled compensation is employed in that the path signal of the film strip is measured via a suitable sensor (8) at the beginning and the end of the total step, the measured speed of each such film segment producing a corresponding compensation signal delivered by regulator 10 to the mechanical-optical compensation unit 11, 12, 13. This unit effects controlled movement of plate 6, thus causing each projected film image to be moved in correspondence to the motion of the two above-noted segments of the film strip.

Figure 4:
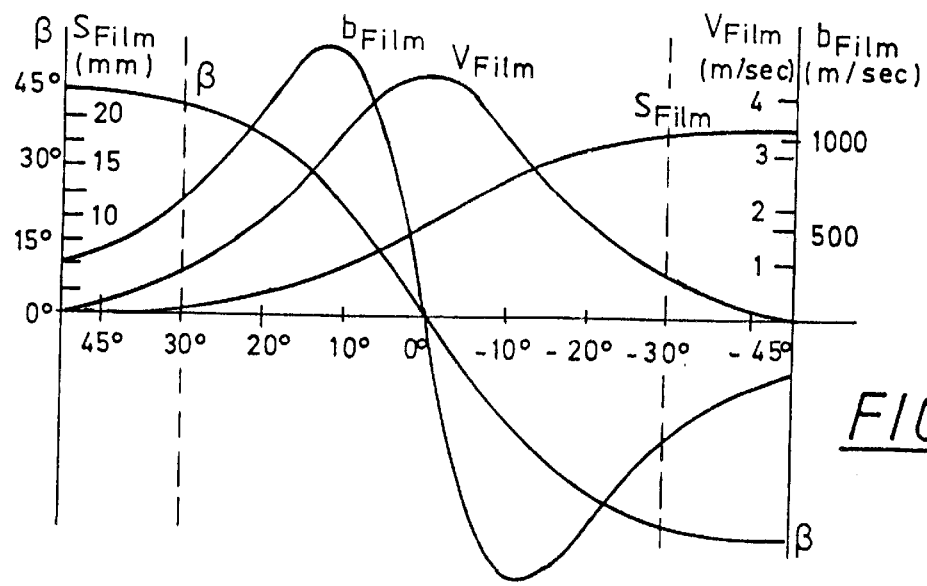
FIG. 4 shows a diagram of the relevant parameters in film projection.

In FIG. 4 the entire path-time diagram is shown, with the film speed v, film acceleration b, film path s and angle of rotation β of the four-part crosswheel with radial slits and tangential engagement being depicted at 24 frames per second as a function of the angle of rotation α of a sprocket wheel.

Figure 5A:
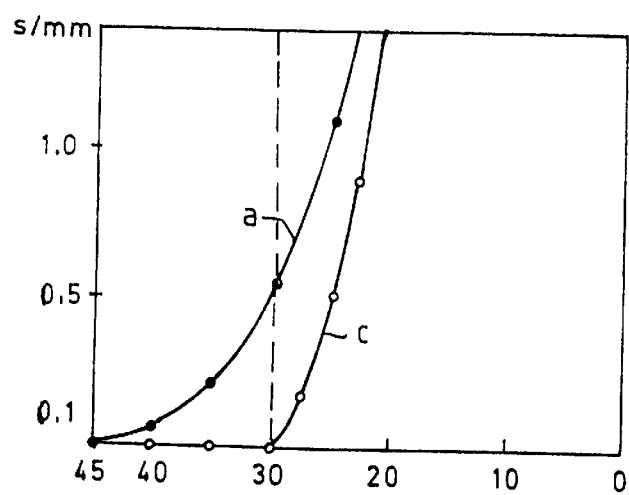
FIG. 5a shows a path-time diagram for a crosswheel gearing.
Figure 5B:
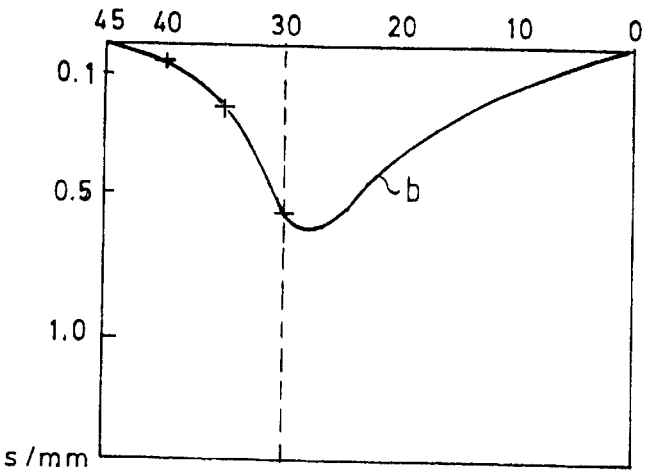
FIG. 5b shows a diagram of the optical compensation path as a function of the instantaneous step angle.

The mode of operation is shown in FIGS. 5a and 5b.

FIG. 5a depicts an enlarged segment of the total path-time diagram from FIG. 4 for a step beginning. Curve a herein shows the path-time curve for the film transport of a four-part crosswheel.

From the geometric relations of the crosswheel gearing the equational connection between rotary angle and transport path s can be derived.

$$s = \frac{r*n}{180} * \left\{ \alpha - \frac{\arctan(\sin\phi)}{\sqrt{2} - \cos\phi} \right\}$$

with r:=sprocket wheel radius

Thus the transport path after 30° at the step beginning amounts to 0.555 mm. The path that can be compensated by a tiltable plane-parallel plate can not be infinitely enlarged. With a constant tilting angle the compensation path depends on the refraction index of the glass and the thickness of the plate.

Figure 2:
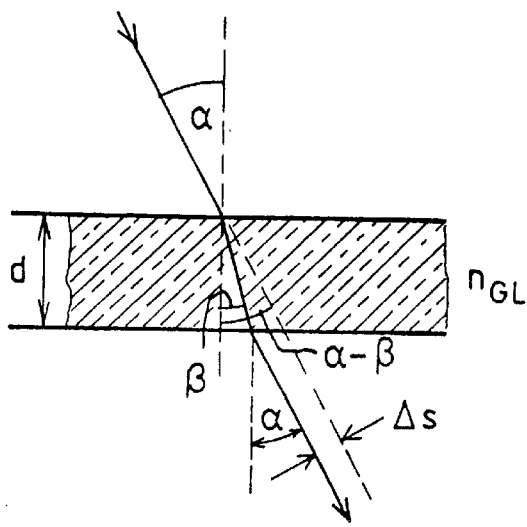
FIG. 2 shows the slanted beam passage through a plane-parallel plate.

The physical relationship of the parallel displacement of a beam falling on a plane-parallel plate such a plate 6 at a slant is shown in FIG. 2. Here the light bundle suffers a double refraction. Upon penetration into the glass it is broken towards the axis of incidence and upon emergence from the plate it is broken away from the axis of incidence.

In the passage through a plane-parallel plate the light bundle suffers no change in direction, but rather merely a parallel displacement δs that increases in direct proportion to increases in plate thickness d; the refraction number is $n_{GL}$ and the angle of incidence is α. The formula is:

$$\delta s = \frac{d * \sin(\alpha - \beta)}{\cos \beta}$$

The connection between tilting angle and parallel displacement of the light can also be derived as follows from Snell's law of refraction:

$$\delta s = d * \sin \alpha * (1 - 1/n) \qquad 2)$$

with n:=refractive index of the glass d:=glass thickness

If normal glass is taken as a basis (e.g. glass type BK 7) with a refractive index of 1.51 and a glass thickness of 5 mm, and if furthermore a tilting angle of plus/minus 20° is permitted, then a displacement of plus/minus 0.521 mm is possible.

Higher-refracting glasses however can also be used, but in doing so it will be necessary to watch for image distortion (color errors). Larger glass thicknesses enlarge the moment of inertia of the compensator, and greater demands on the drive element must be made. Furthermore, the resonance frequency of the compensation system is reduced.

In FIG. 5b the optical compensation path possible under the above-given conditions is shown as curve b as a function of the instantaneous step angle. An antiphase parallel displacement of the light path occurs therein by means of the plane-parallel plate.

Curve c in FIG. 5a depicts the sum of the mechanical transport path and the optical compensation path (c=a+b) as presented to the viewer with no shutter diaphragming. The movement of the film strip is not perceived by the viewer until after (45°−30°)−15°. The same applies to the step end.

The dark field can accordingly be reduced from 90° to 60° without diminishing contrast or blurring the image. The shutter ratio ö gives the relationship of the sum of all bright fields to the sum of all dark fields:

without compensation $$\ddot{o} = 2*90°/2*90° = 1 \qquad 3)$$

with compensation $$\ddot{o} = 2*120°/2*60° = 2 \qquad 4)$$

The influence of the better shutter ratio on the total lighting balance and the screen luminance can be derived from the following Table 1.

TABLE 1

Summary of influences detrimental to the luminous flux

| Loss | Cinema projection mirror arc lamp loss factor | Loss in % | Lightbulb with capacitor loss factor | Loss in % |
|---|---|---|---|---|
| by the aperture angle of the lighting optics | 0.8 | 20 | 0.25 | 75 |
| reflection and absorption loss at the lighting optics | 0.9 | 10 | 0.8 | 20 |
| by carbon holder shadows | 0.9 | 10 | — | — |
| by the rotary shutter | 0.5 | 50 | 0.5 | 50 |
| by diaphragming at the film window | 0.4 | 60 | 0.3 | 70 |
| reflection and absorption loss at the objective | 0.85 | 15 | 0.85 | 15 |
| loss at the projection booth window | 0.9 | 10 | — | — |
| diaphragming at the objective | — | — | — | — |
| product of the loss factors | 0.1 | 90 | 0.025 | 97.5 |
| efficiency in % | — | 10 | — | 2.5 |

The loss factor for the rotary shutter is given at 0.5. A new calculation with altered loss factor v=0.67 results in the following values:

TABLE 2

|  | v = 0.5 | v = 0.67 |
|---|---|---|
| product of the loss factors | 0.1 | 0.133 |
| efficiency in % | 10 | 13.3 |

When viewed superficially, the efficiency increases by a mere approximately 3%.

However, what is decisive is the attainable screen luminance in comparison to the shutter with v=0.5. With this reference the luminance increases by 33%.

Changes in the shutter and the screen luminance normally have an effect on the flicker fusion threshold (the lowest admissible shutter frequency).

Figure 3:
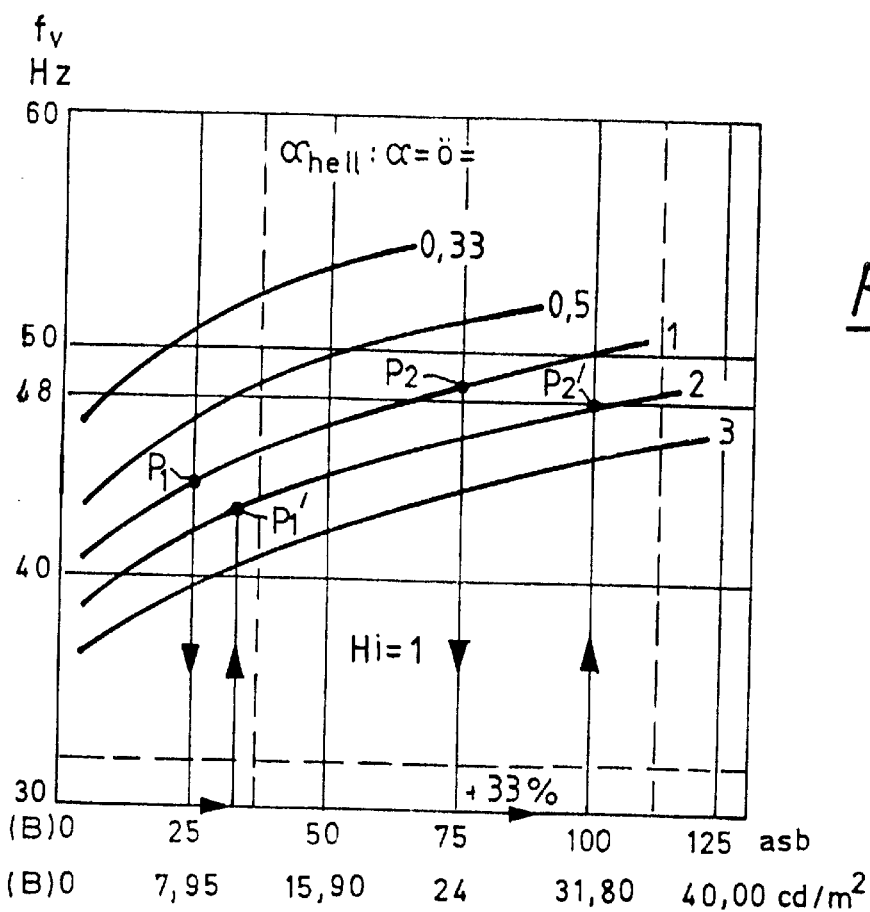
FIG. 3 shows a diagram referring to the dependencies of shutter ratio, screen luminance and flicker fusion threshold.

FIG. 3 shows the lowest allowable shutter frequency $f_r$ (flicker fusion threshold) of symmetrical rotary shutters as a function of the screen luminance (B) (according to Arndt) and thus reflects the dependencies between shutter ratio, screen luminance and flicker fusion threshold.

The family of curves corresponds to different shutter ratios. Ordinarily a two-blade flap with ö=1 is used (2*90° dark field sectors).

By means of the optical compensation depicted a ratio of for example ö=2, represented by the corresponding curve, is possible.

For an accurate comparison to be made the 33% rise in screen luminance must be taken into consideration.

As examples two points P1 and P2 are shown lying respectively over the luminance values 25 and 75 asb. The points of intersection with the associated shutter curve (2) show that the flicker fusion threshold (critical shutter frequency) lies somewhat below the flicker fusion threshold of the closure (1). With higher screen luminance values the flicker fusion thresholds are virtually identical.

This means that in this case the increase in screen luminance has no negative influence on the critical flicker fusion threshold, which is usually not the case.

Ordinarily the result of an increase in screen luminance is that the shutter frequency must be increased or flickering phenomena will appear.

The same effect as in the plane-parallel plate can also be achieved with rotary prisms, mirrors and translationally moved lenses or lens systems.

How this is to take place is described in any good manual for technical optics and belongs to the knowledge of an expert active in the field of technical optics.

The flicker phenomena at high screen luminance can be reduced. To avoid flickering at higher screen luminance values the shutter frequency must be increased. This is possible with a three-blade shutter. The shutter frequency then increases from 48 Hz to 72 Hz. The additional third blade however, usually causes a corresponding light loss by increasing the cumulative dark phases.

Relief is provided here by the optically compensated shutter angle reduction. Three symmetrical blades with a total dark phase of 3*60°=180° are introduced. This dark phase is identical to that of the conventional two-blade shutter with 2*90°=180°.

As a result a shutter frequency of 72 Hz is possible, without the screen luminance being reduced and without the occurrence of diminished contrast or a blurred image. As FIG. 3 reveals, higher screen luminance values are no problem at all. The shutter factor ö in this arrangement is ö=1.

Figure 6:
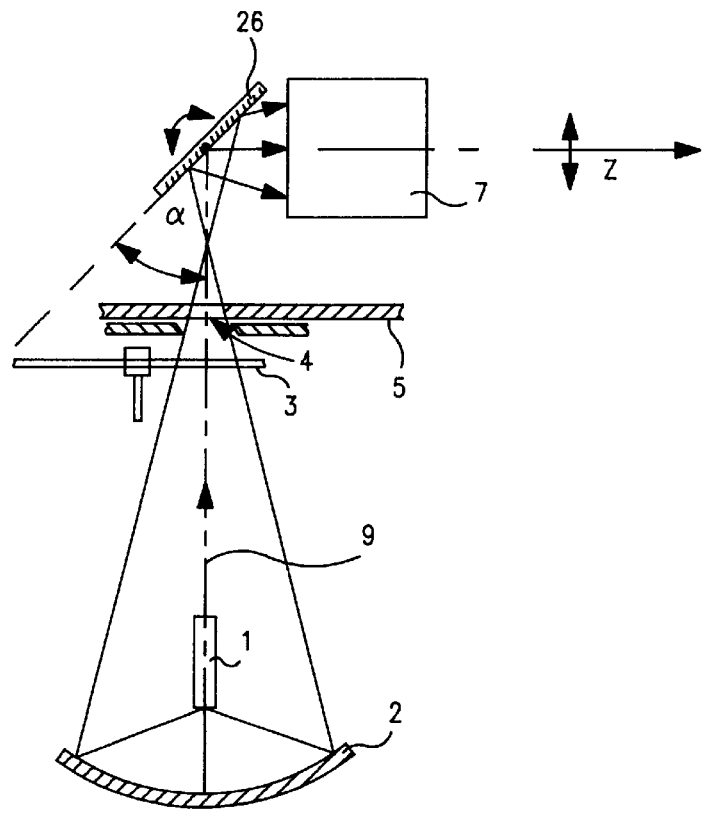
FIG. 6 shows an apparatus like FIG. 1(a) but using a plane mirror instead of a plane plate as an optical compensator.

In the embodiment of FIG. 6, a xenon bulb 1 projects via a concave mirror 2 film images of a film strip 5 which is transported step by step, i.e. image by image, on to a screen. A shutter 3 which is upstream from the film strip 5 interrupts the ray path during the transportation of the film strip 5 from one single image 4 to the next and synchronized with it. The shutter 3 can be a rotating disk, which has slot apertures distributed regularly over the periphery corresponding to the dimensions of the image.

In the example of the embodiment in FIG. 6, between the imaging lens 7 and the illuminated film strip 4, a flat mirror 26, which is tiltable through the angle a, is positioned. If the mirror is tilted through an angle against its idle position, the angle of reflection then changes to the same degree as the angle of incidence of the projected light. The ray path is displaced parallel to the rotational axis of the flat mirror 26 and therefore the image 4 which is projected through the lens 7 on to the screen as well, namely in the direction Z. The reflecting flat mirror 26 thereby takes over the same function as the transparent flat glass plate 6 which is described and/or shown in FIGS. 1a and 1b.

Figure 7:
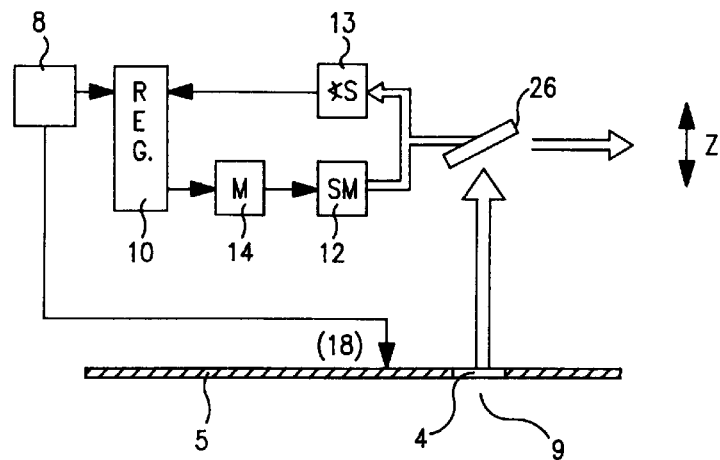
FIG. 7 shows a circuit arrangment for the apparatus of FIG. 6.

FIG. 7 shows in principle the same circuit arrangement as FIG. 1b, whereby solely the light transparent flat glass plate has been replaced by the flat mirror 26. The sensor on the intermittently moved film strip 5 is marked as 18, and its control arrangement as 8.

The sensor 18, 8 measures the speed of the film strip and sends a corresponding signal to the control or regulator 10 which was described in detail already in connection with FIG. 1b. This control 10 supplies a corresponding rotary angle proportional signal to a motor drive 11, which controls correspondingly a step motor 12. Thereby, corresponding to the film strip speed which is measured by the sensor 18, 8, a correspondingly large tilt motion of the flat mirror 26 is effected. Thereby the projected individual image of the film strip is correspondingly displaced, the image appears to be stationary and thereby it is sharp, although the film strip motion has not yet been concluded. This process is carried out at the beginning and at the end of the film strip movement until it is in its idle position. Thereby the dark phase or closure time of the film projector is reduced, the light yield, i.e. the proportion of the light projected onto the screen, is increased, and whithout loss of the sharp focus of the projection.

The tilt axis of the flat mirror 26 is rigidly coupled with an angle sensor 13, which supplies an actual value to the control 10, which is compared with the rated value signal supplied by sensor 8, in order to control correspondingly the motor drive 11.

Figure 8:
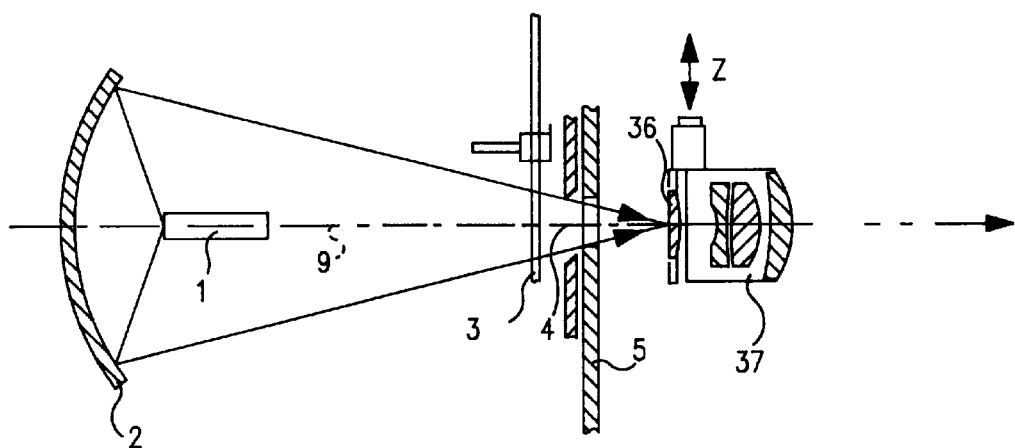
FIG. 8 shows an apparatus like FIG. 1(a) but using a lens instead of a plane plate as an optical compensator.

FIG. 8 is in principle structured in the same manner, in which solely a movable lens 36 is installed instead of a reflecting flat mirror, forming the input lens of an objective lens, but decoupled from it mechanically and being supported to be displaceable translationally to the axis of projection. A translational movement of the lens 36 against the projection axis 9 causes a corresponding translational displacement of the individual image within the zone Z.

Figure 9:
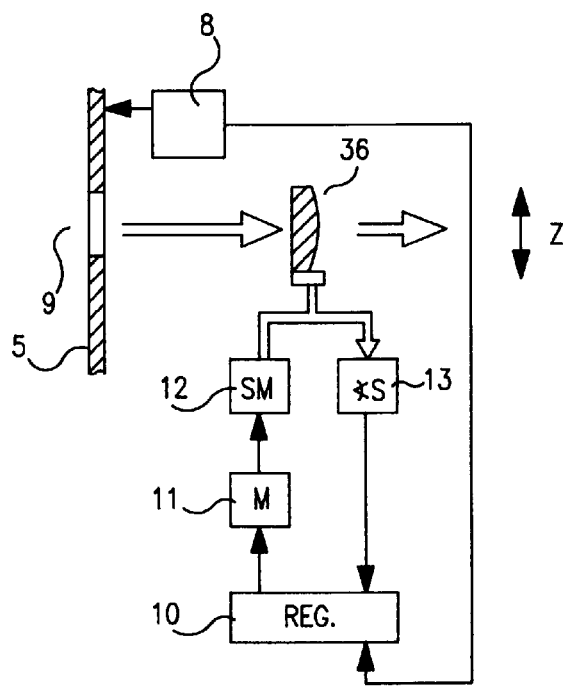
FIG. 9 shows a circuit arrangement for the apparatus of FIG. 8.

FIG. 9 shows a corresponding circuit diagram as in FIG. 7, but with the use of a laterally movable lens 36. Of course the lens 36 which is decoupled from the other objective lens 37 must be provided with a suitable bearing for the lateral displacement.

Figure 10:
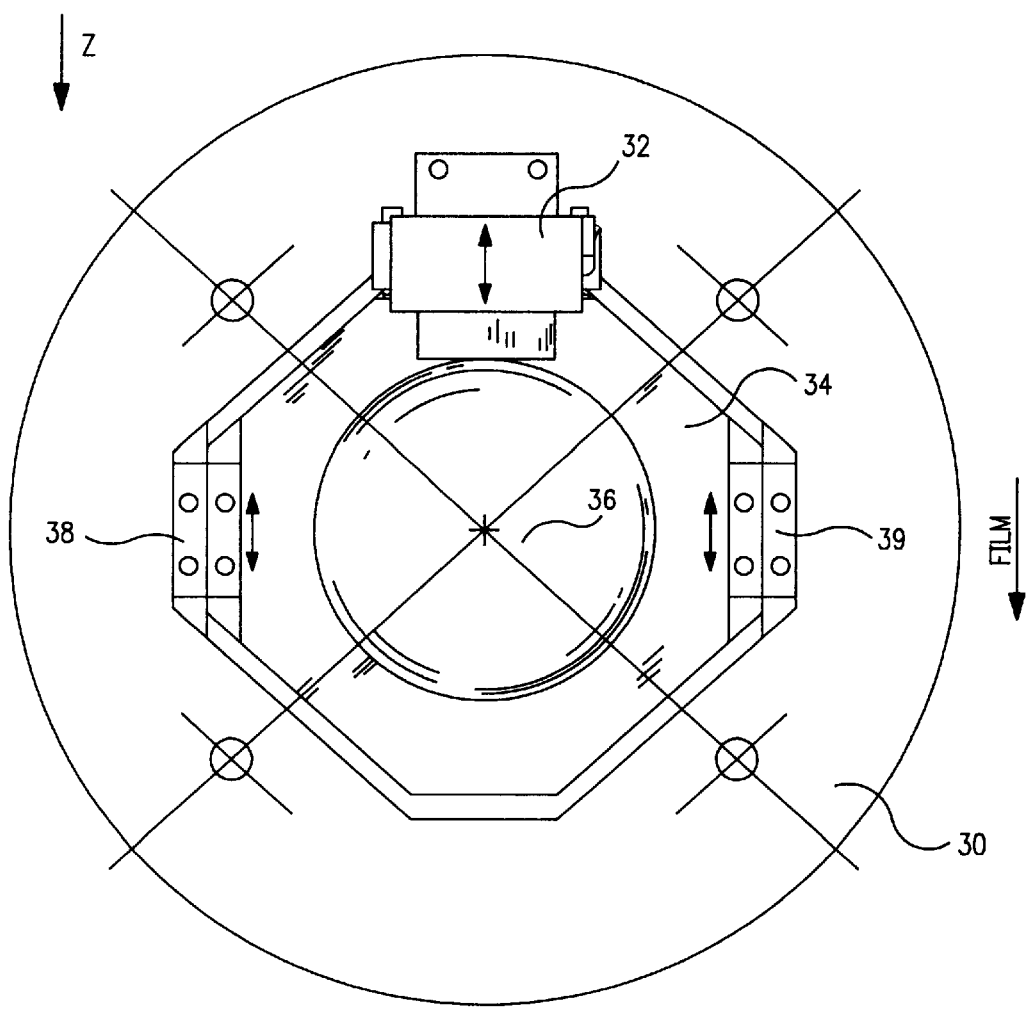
FIG. 10 shows a reception ring for the lens.

FIG. 10 shows a support ring 30, on which the individual lens 36, which is displaceable on a parallel guide 38, 39 in the Z direction, is supported. A linear motor 32 can be used for displacement, which is rigidly connected with a lens holder 34.

Each optical-mechanical compensation has the result of an additional light projection in the adjacent zones of the individual still image, where the film strip is braked and/or is again accelerated. For this purpose, the aperture or the apertures of the shutter 3 must be correspondingly enlarged.

What is claimed is:

1. A method of shortening a closure time of a shutter in a cinema projector of a type which operates intermittently to advance a strip of film step by step to place successive film frame images into registry with an image window of the projector for projection to a screen, and simultaneously to cause a shutter blade in the projector to close said image window to cause a dark phase operation during each advance of the film, comprising determining a rate at which each frame of the film begins and ends the advance thereof into registry with said image window, generating a signal proportionate to said rate, and employing between said image window and said screen movable optical compensation means responsive to said signal to shorten a time during which said shutter closes said image window during each intermittent advance of said film, thereby to increase a luminous efficiency factor by reducing the dark phase operation of said projector.

2. An apparatus for shortening a closure time of a shutter in a cinema projector type which operates intermittently to advance a strip of film step by step to place successive film frame images into registry with an image window in the projector for projection to a screen, and simultaneously to cause a shutter in the projector to close said image window to cause a dark phase operation during each advance of the film, comprising means for determining a rate at which each frame of the film begins and ends the advance thereof into registry with said image window, means for generating a signal proportionate to said rate, and movable optical compensation means interposed between said image window and said screen and responsive to said signal to shorten a time said shutter closes said image window during each intermittent advance of said film, thereby to increase a luminous efficiency factor of the projector by reducing the dark phase operation of said projector.

3. The apparatus according to claim 2, characterized in that said optical compensation means comprises a plane-parallel plate facing said image window.

4. The apparatus according to claim 2 characterized in that said optical compensation means comprises a rotary polygonal prism.

5. The apparatus according to claim 2 characterized in that said optical compensation means comprises a mirror.

6. The apparatus according to claim 2 characterized in said optical compensation means comprises a translationally movable lens.

7. The apparatus according to one of claims 3 to 6, characterized in that said shutter is a multi-blade shutter containing a optically compensating shutter angle reduction.

8. A method for shortening a closure time of a shutter in a film projector with respect to film frame images on a film strip which is moved by the projector intermittently to place one frame after the other into a projection position adjacent to an image window of the projector where the frame is stationary, and in which a light source projects light through the stationary frame and adjacent window onto a projection screen via a shutter which opens and closes alternately in synchronization with the film transport, including a) measuring a speed of the film motion in a decelerating segment at the end of an intermittent film motion and in an equally large accelerating segment at the beginning of the next film motion to advance the next individual frame to said projection position, b) producing for each measured speed a corresponding compensation signal that is sent to a mechanical-optical compensation unit which causes each projected individual frame to be moved in correspondence to the motion of the film strip in the two segments named above, and c) causing the projector shutter to permit light to pass through the advancing film image during each of said two segments.

* * * * *